United States Patent
Beyer et al.

(10) Patent No.: US 8,869,758 B1
(45) Date of Patent: Oct. 28, 2014

(54) EXHAUST VALVE BRIDGE AND CYLINDER COOLING

(71) Applicant: Ford Global Technologies, LLC, Dearborn, MI (US)

(72) Inventors: Theodore Beyer, Canton, MI (US); John Christopher Riegger, Ann Arbor, MI (US); Jody Michael Slike, Farmington Hills, MI (US); Philip Damian Cierpial, Grosse Pointe Park, MI (US); Jeffrey D. Fluharty, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/049,748

(22) Filed: Oct. 9, 2013

(51) Int. Cl.
*F02F 1/42* (2006.01)
*F02F 1/10* (2006.01)

(52) U.S. Cl.
CPC .......................................... *F02F 1/10* (2013.01)
USPC .................................. 123/41.82 R; 123/41.85

(58) Field of Classification Search
CPC ................. F02F 1/40; F02F 1/14; F02F 1/10; F02F 1/36; F02B 19/18
USPC .............. 123/41.82 R, 41.85 A, 41.85, 41.76, 123/41.01
See application file for complete search history.

(56) References Cited

U.S. PATENT DOCUMENTS

| 4,034,723 | A | * | 7/1977 | Hamparian | 123/41.76 |
| 4,860,700 | A | * | 8/1989 | Smith | 123/41.31 |
| 5,086,733 | A | * | 2/1992 | Inoue et al. | 123/41.84 |
| 5,222,464 | A | | 6/1993 | Oyaizu | |
| 5,720,240 | A | | 2/1998 | Dohn et al. | |
| 6,422,305 | B2 | | 7/2002 | Jainek | |
| 6,976,683 | B2 | * | 12/2005 | Eckert et al. | 277/591 |
| 7,032,547 | B2 | * | 4/2006 | Xin | 123/41.72 |
| 8,082,894 | B2 | * | 12/2011 | Poschl et al. | 123/41.82 R |
| 8,584,628 | B2 | * | 11/2013 | Brewer et al. | 123/41.82 R |
| 2011/0114041 | A1 | * | 5/2011 | Hamakawa et al. | 123/41.72 |
| 2011/0315098 | A1 | * | 12/2011 | Kosugi et al. | 123/41.74 |
| 2012/0012073 | A1 | | 1/2012 | Brewer et al. | |
| 2014/0020639 | A1 | * | 1/2014 | Poschl et al. | 123/41.34 |

FOREIGN PATENT DOCUMENTS

| EP | 1972772 A2 | 9/2008 |
| EP | 1884647 B1 | 4/2009 |
| GB | 2441148 A | 2/2008 |

* cited by examiner

*Primary Examiner* — Noah Kamen
*Assistant Examiner* — Long T Tran
(74) *Attorney, Agent, or Firm* — Greg P. Brown; Brooks Kushman P.C.

(57) ABSTRACT

An engine is has a cylinder block defining a cylinder and a block cooling jacket having an open passage along a block deck face, and a cylinder head having an exhaust bridge conduit. A head gasket is placed between the block and the head and defines first and second apertures connecting the open passage of the block cooling jacket to the exhaust bridge conduit. A cylinder head has a deck face, and a cooling jacket. The cooling jacket has a passage formed by an inlet channel with a conduit at one end and extending into an exhaust bridge between adjacent exhaust ports. The inlet channel intersects the deck face and is elongated along a longitudinal axis of the cylinder head. The inlet channel has a convex surface positioned between opposed ends of the channel and extending away from the deck face.

20 Claims, 7 Drawing Sheets

EXHAUST VALVE BRIDGE AND CYLINDER COOLING

TECHNICAL FIELD

Various embodiments relate to cooling passages for an exhaust bridge between two exhaust ports in a cylinder head of an internal combustion engine.

BACKGROUND

In water-cooled engine cylinder head design, sufficient cooling needs to be provided to the exhaust valves and seats and to the engine cylinders. Many conventional designs use small drilled passages from the deck face of the cylinder head, or the bottom side of the cylinder head on the surface that interfaces with the cylinder block. These small drilled passages, also known as exhaust bridge drills, provide high velocity coolant in the cylinder head and between exhaust valve seats to target cooling the exhaust valves and cylinder. Two exhaust valve seats may be present for each cylinder of the engine. Although these drills provide cooling of the exhaust valves and seats, flow may be limited by the diameter of the drill that is able to fit between the exhaust valve seats as well as restricted by the geometry at the entrance to the drill. Also, cooling of the exhaust valves and seats may differ based on the order of the drill passages with less coolant provided to the later passages.

SUMMARY

In an embodiment, an internal combustion engine is provided with a cylinder block defining first and second cylinders and a block cooling jacket having an open passage along a block deck face. A cylinder head has a deck face defining a first chamber with a first pair of exhaust ports spaced apart by a first exhaust bridge, and a second chamber with a second pair of exhaust ports spaced apart by a second exhaust bridge. The cylinder head has a head cooling jacket with a first passage adapted to cool the first exhaust bridge and a second passage adapted to cool the second exhaust bridge, where each passage is formed by an inlet channel and a conduit adjacent to the associated exhaust bridge, and each inlet channel intersects the deck face and is elongated along a longitudinal axis of the cylinder head to be offset from the associated conduit. A head gasket is placed between the cylinder block and the cylinder head. The head gasket defines a first aperture positioned between the open passage of the block cooling jacket and the inlet channel of the first passage, and a second aperture positioned between the open passage of the block cooling jacket and the inlet channel of the second passage.

In another embodiment, a cylinder head is provided with a deck face, and a cooling jacket. The cooling jacket has a passage formed by an inlet channel with a conduit at one end and extending into an exhaust bridge between adjacent exhaust ports. The inlet channel intersects the deck face and is elongated along a longitudinal axis of the cylinder head. The inlet channel has a convex surface positioned between opposed ends of the channel and extending away from the deck face.

In yet another embodiment, an engine is provided with a cylinder block defining a cylinder and a block cooling jacket having an open passage along a block deck face, and a cylinder head having an exhaust bridge conduit. A head gasket is placed between the block and the head and defines first and second apertures connecting the open passage of the block cooling jacket to the exhaust bridge conduit.

In another embodiment, a head gasket for an engine having a cooling jacket is provided by a generally planar gasket body having an upper surface for cooperation with a cylinder head deck face and a lower surface for cooperation with a cylinder block deck face. The gasket has formed therein a first pair of apertures extending between the upper and lower surfaces of the gasket body and adjacent to a cylinder block cooling passage. One of the first pair of apertures is adjacent to an upstream end of an elongated entrance region to a first exhaust bridge cooling passage associated with a first cylinder. The other of the first pair of apertures is adjacent to a downstream end of the elongated entrance region to the first exhaust bridge cooling passage. The gasket has formed therein a second pair of apertures extending between the upper and lower surfaces of the gasket body and adjacent to the cylinder block cooling passage. One of the second pair of apertures is adjacent to an upstream end of an elongated entrance region to a second exhaust bridge cooling passage associated with a second cylinder. The other of the second pair of apertures is adjacent to a downstream end of the elongated entrance region to the second exhaust bridge cooling passage. A summed cross sectional area of each pair of apertures increases for each cylinder along a direction of coolant flow in the cylinder block cooling passage.

Various embodiments of the present disclosure have associated, non-limiting advantages. For example, for a given drill diameter, the coolant flow through the exhaust bridge drill or cooling passage can be increased significantly by improving the geometry at the entrance to the drilling to reduce losses at the entrance of the drill. An inlet channel to the exhaust bridge coolant passage may be provided and be extended along an upstream direction of coolant flow in the cylinder block to allow for a greater area and volume to prepare the flow that is transferred from the cylinder block to the exhaust bridge coolant passage. The inlet channel may include a convex surface that provides a large fillet radius before the entrance to the conduit of the exhaust bridge cooling passage to better direct the flow to reduce losses. Additionally, a head gasket may be used that provides two apertures, or apertures in other configurations, in fluid communication with the exhaust bridge coolant passage to provide for improved flow control, including velocity and streamline, within the exhaust bridge cooling passage and conduit.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
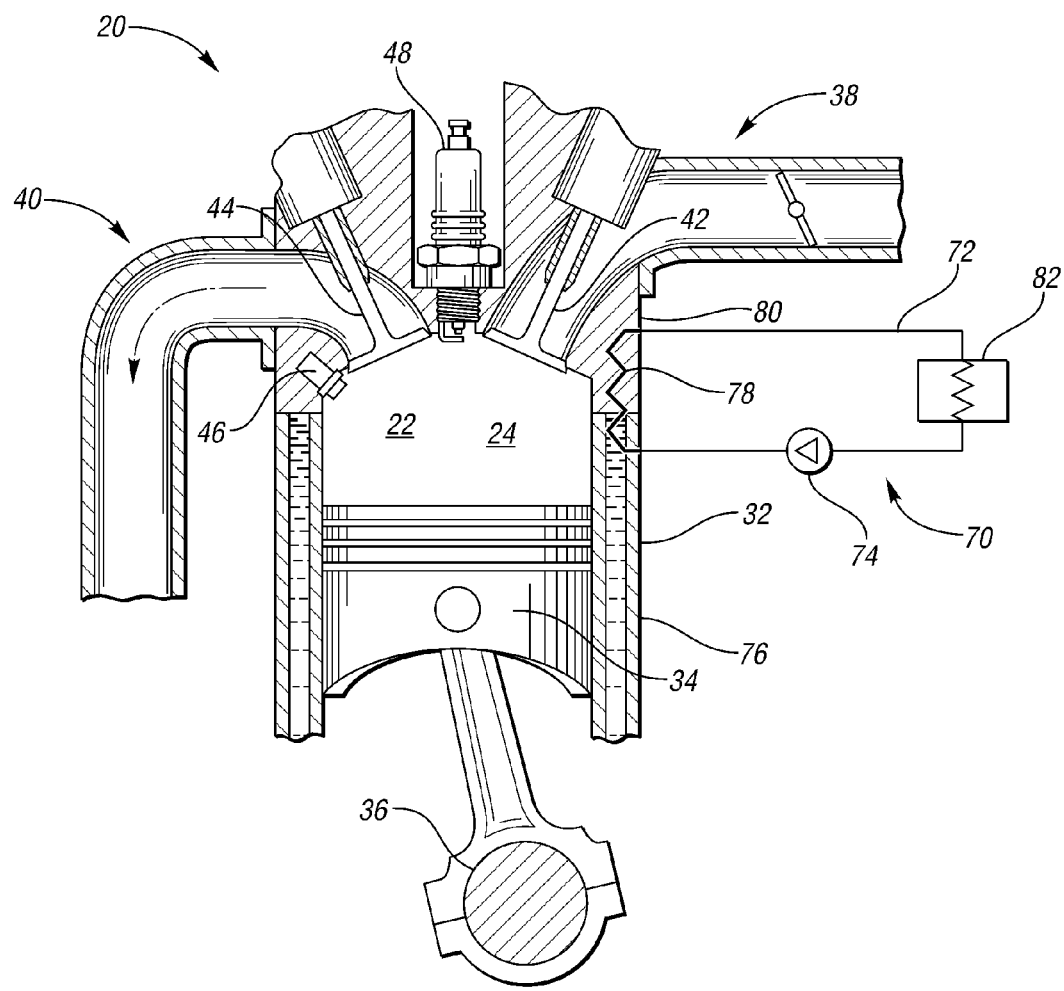
FIG. 1 illustrates a schematic of an engine configured to implement the disclosed embodiments.

FIG. 1 illustrates a schematic of an internal combustion engine 20. The engine 20 has a plurality of cylinders 22, and one cylinder is illustrated. The engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with the intake manifold 38 and the exhaust manifold 40. An intake valve 42 controls flow from the intake manifold 38 into the combustion chamber 30. An exhaust valve 44 controls flow from the combustion chamber 30 to the exhaust manifold 40. The intake and exhaust valves 42, 44 may be operated in various ways as is known in the art to control the engine operation.

A fuel injector 46 delivers fuel from a fuel system directly into the combustion chamber 30 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 30. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 operates under a four-stroke cycle including an intake stroke, a compression stroke, an ignition stroke, and an exhaust stroke. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 includes a cooling system 70 to remove heat from the engine 20. The amount of heat removed from the engine 20 may be controlled by a cooling system controller or the engine controller. The cooling system 70 may be integrated into the engine 20 as a cooling jacket. The cooling system 70 has one or more cooling circuits 72 that may contain water or another coolant as the working fluid.

The cooling system 70 has a pump 74 that provides fluid in the circuit 72 to cooling passages in the cylinder block 76. The cooling passages in the cylinder block 76 may be adjacent to one or more of the combustion chambers 24 and cylinders 22. All or a portion of the coolant in the cylinder block 76 may then travel through apertures in a head gasket 78 to the cylinder head 80. The cylinder head 80 is connected to the cylinder block 76 to form the cylinders 22 and combustion chambers 24. The gasket 78 in interposed between the cylinder block 76 and the cylinder head 80 to seal the cylinders 22. The cylinder head 80 may also receive coolant directly from the pump 74. Coolant flows through the cylinder head 80 and then out of the engine 20 to a radiator 82 where heat is transferred from the coolant to the environment.

Figure 2:
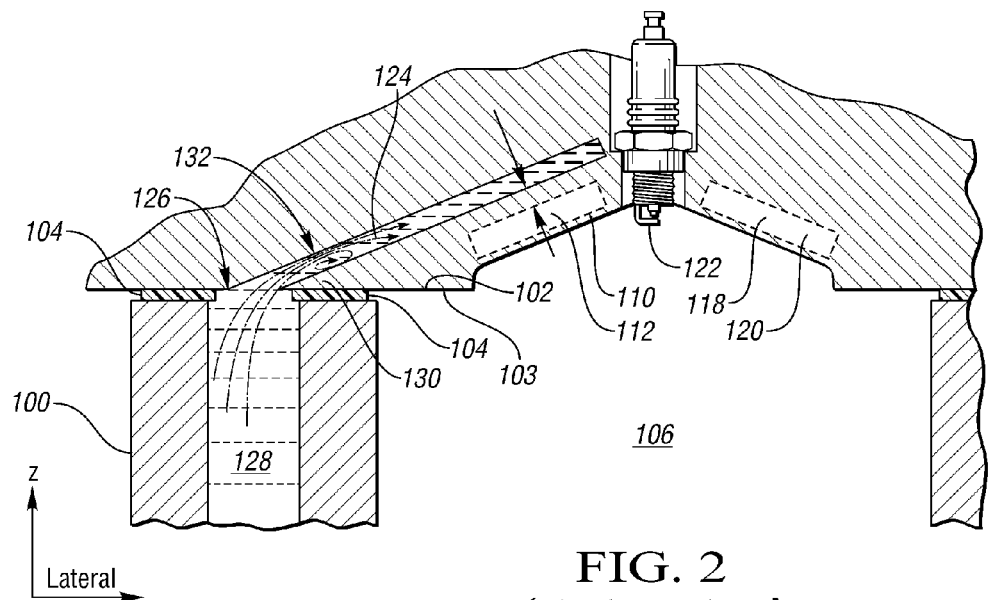
FIG. 2 illustrates a side view schematic of fluid flow through an exhaust bridge drill according to the prior art.
Figure 3:
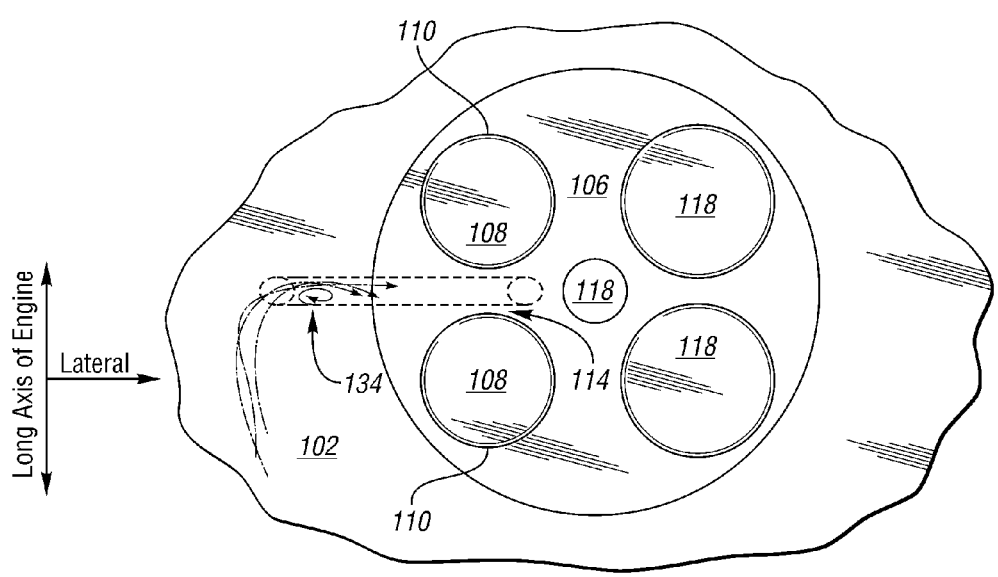
FIG. 3 illustrates a bottom view schematic of fluid flow through an exhaust bridge drill according to the prior art.

FIGS. 2 and 3 illustrate schematics of fluid flow through a conventional exhaust bridge drill passage in a conventional cylinder head. The cylinder block 100 of the engine is connected to the cylinder head 102 using a head gasket 104 to form a combustion chamber 106 in the engine. The deck face 101 of the cylinder block 100 and the deck face 103 of the cylinder head 102 are in contact with first and second opposed sides of the gasket 104. The cylinder head 102 has a pair of exhaust valves 108. The exhaust valves 108 are located in exhaust ports 110 in the cylinder head 102 and are seated on valve seats 112. Between the exhaust valve ports 110 is an exhaust valve bridge 114.

The cylinder head 102 has a pair of intake valves 116. The intake valves 116 are located in intake ports 118 in the cylinder head 102 and are seated on valve seats 120. The cylinder head 102 also has a spark plug 122.

An exhaust bridge passage 124 is included in the cooling system to cool the exhaust bridge 114. The flow through these exhaust bridge passages 124 is limited by the diameter of the drill that is able to fit between the exhaust valve ports 110 and seats 112 as well as restricted by the geometry at the entrance to the drill passage 124 shown generally by arrow 126.

Coolant flows from a passage 128 in the cylinder block 100 through the gasket 104, and to the bridge cooling passage 124. As shown in FIG. 2, the entrance to the exhaust bridge cooling passage forms a knife edge 130, which causes separation and a zone of fluid recirculation 132 in the passage 124. As shown in FIG. 3, the coolant flows along a longitudinal axis of the cylinder block and to the various cylinders. As the flow makes a generally perpendicular turn from along the longitudinal axis to a direction having a lateral axis component, a zone of recirculation 143 may form. Zones 132 and 134 may be formed within generally same location or region of the passage, or may form in different locations.

Additionally, the coolant flows across an abrupt decrease in effective diameter at the entrance 126 between the cylinder block passage 128 and the exhaust bridge passage 124. This causes a vena contracta effect further decreasing the already limited diameter of the exhaust bridge passage 124 and contributing to the separation zones 132, 134 as the streamlines cannot follow the discrete changes in direction and cross sectional area. Note that the recirculation zone 132 is on the size of the cooling passage 124 that is adjacent to the exhaust seats where maximum cooling is desirable, and that the higher velocity flow is on the side of the passage 124 away from the exhaust bridge, thereby reducing the efficiency and effectiveness of exhaust bridge cooling passage and the cooling system.

Figure 4:
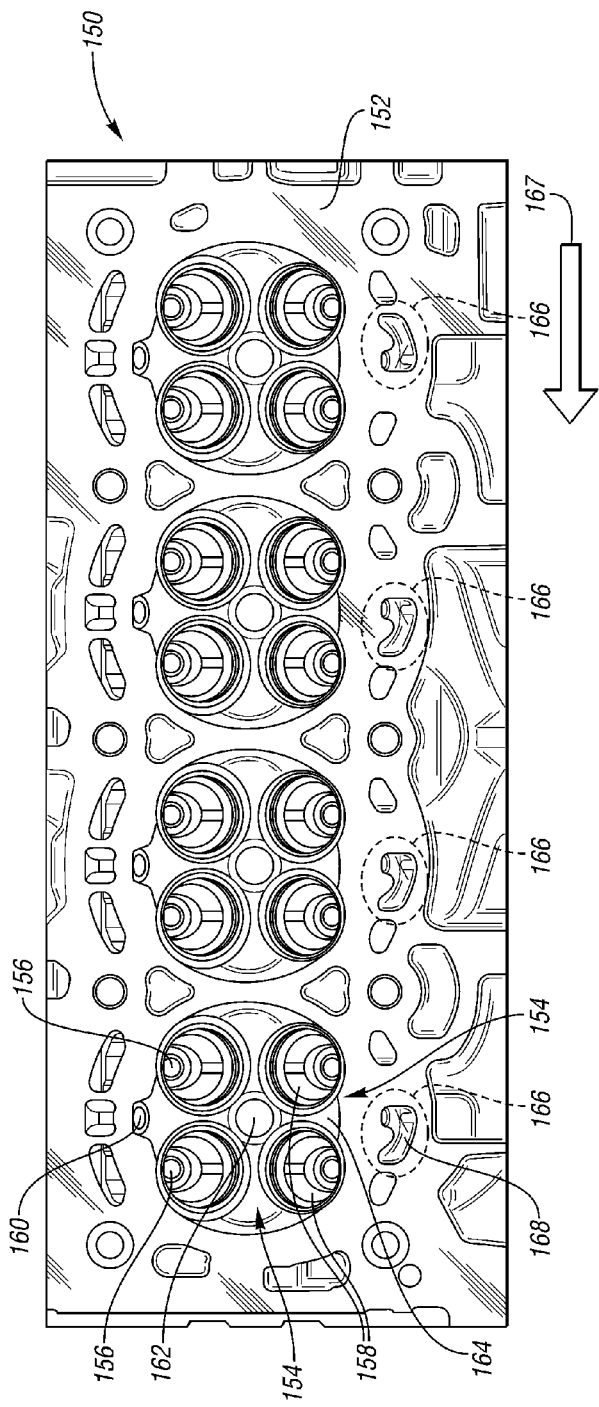
FIG. 4 illustrates a perspective view of a cylinder head according to an embodiment.

FIG. 4 illustrates a partial bottom perspective view of a cylinder head 150 employing an embodiment of the present disclosure. The cylinder head 150 may be cast out of a suitable material such as aluminum. The cylinder head 150 is a component in an in-line four cylinder engine, although other engine configurations may also be used with the present disclosure. The cylinder head 150 has a deck face 152 or bottom face that forms chambers 154. Each chamber 154 cooperates with a corresponding chamber in a cylinder block to form a cylinder and combustion chamber. Each chamber 154 has a pair of intake ports 156 sized to receive intake valve seats and intake valves. Each chamber 154 also has a pair of exhaust ports 158 sized to receive exhaust valve seats and exhaust valves. A port 160 is provided for an injector, and another port 162 is provided for a spark plug. Various passages are also provided on the deck face 152 and within the cylinder head 150 to cooperate with corresponding ports on the cylinder block to form a cooling jacket for the engine. Coolant in the cylinder block passages in the block deck face may travel along a longitudinal axis 167 or longitudinal direction of the engine such that coolant is provided to the cylinders in a sequential manner.

An exhaust bridge 164 is formed between the pair of exhaust ports 158. An exhaust bridge cooling passage 166 is associated with each exhaust bridge 164 and chamber 154. The deck face 152 defines the entrance 168 to the exhaust bridge cooling passage 164. The exhaust bridge 164 may require cooling with engine operation as the temperature of the bridge 164 may increase due to convective heating from hot exhaust gases in the combustion chamber as well as conduction heating from the exhaust valves, etc. The cooling of the cylinder and exhaust valves and bridge 164 may be improved by lowering flow restrictions through the exhaust valve cooling passage 166, which in turn may improve fuel economy, increase engine life and durability, etc. Additionally, the exhaust bridge cooling passage 166 is often one of the most restricted flow passages in the cylinder head 150 cooling jacket. By decreasing the flow restriction and pressure drop across the passage 166, the cooling efficiency of the cylinder head 150 and engine cooling jacket may be increased such that there is a reduced pressure drop across the engine cooling jacket running at the same flow velocities or there is an increased velocity through the engine cooling jacket running at the same pressure drop. Increasing the velocity causes an increase the heat transfer from the engine to the cooling system. Decreasing the pressure causes an increase the energy efficiency of the cooling system.

Figure 4A:
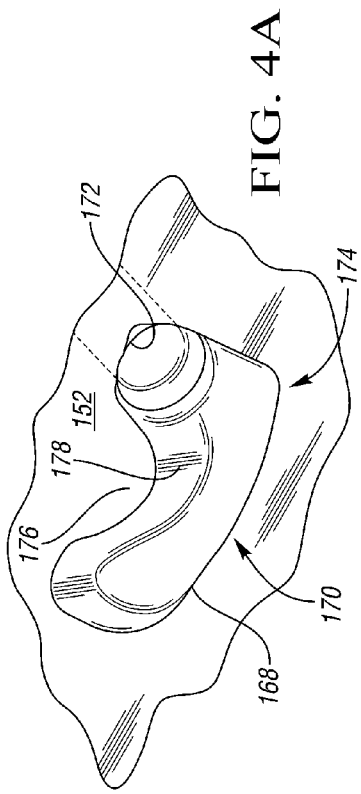
FIG. 4A illustrates an enlarged perspective view of an entrance to an exhaust valve cooling passage of FIG. 4.

FIG. 4A illustrates an enlarged view of the entrance 168 to the exhaust bridge cooling passage 166. The passage 166 has an inlet channel 170 or pocket or slot that directs coolant to a conduit 172. The conduit 172 forms the drill passage that is adjacent to the exhaust bridge 164.

The entrance 168 forms the outer profile of the inlet channel 170 in the plane of the deck face 152 of the cylinder head. The inlet channel 170 includes a complex geometry. The inlet channel 170 may be elongated generally along the longitudinal axis of the cylinder block and cylinder head 150, or alternatively, is elongated in the direction of cylinder block coolant flow in a corresponding cylinder block deck face passage. In some examples, the inlet channel 170 includes a bean shaped section or boot shaped section. The entrance 168 has a concave section 174 and a convex section 176. The convex section 176 extends into the depth of the inlet channel 170 to provide a convex surface profile 178 on the wall of the channel 170. Additional details of the passage 166 are described below with reference to FIGS. 6-9.

For a given drill diameter, the coolant flow through the exhaust bridge drill conduit 172 may be increased significantly by improving the geometry at the entrance to the drilling by using the inlet channel 170 to reduce entrance losses to the passage, for example, by reducing or removing recirculation zones in the coolant flow. The inlet channel 170 where the passage 166 intersects the bottom surface or deck face 152 of the cylinder head is extended in an upstream direction of coolant flow, for example, along the longitudinal axis 167. The inlet channel 170 provides a larger cross-sectional area as well as a larger volume to prepare the flow that is transferred from the cylinder block to the exhaust bridge drill passage 166. The inlet channel 170 has a convex section 176 and channel wall surface profile 178 that smoothly blends the wall of the channel 170 to the entrance of the exhaust bridge drill conduit 172 by use of a large fillet radius shown by the convex section and profile 176, 178. In a conventional design, a large radius at the drill entrance was not possible without moving the location and position of the drill passage and thus potentially jeopardizing the targeting of the flow to the exhaust valve seats.

Figure 5:
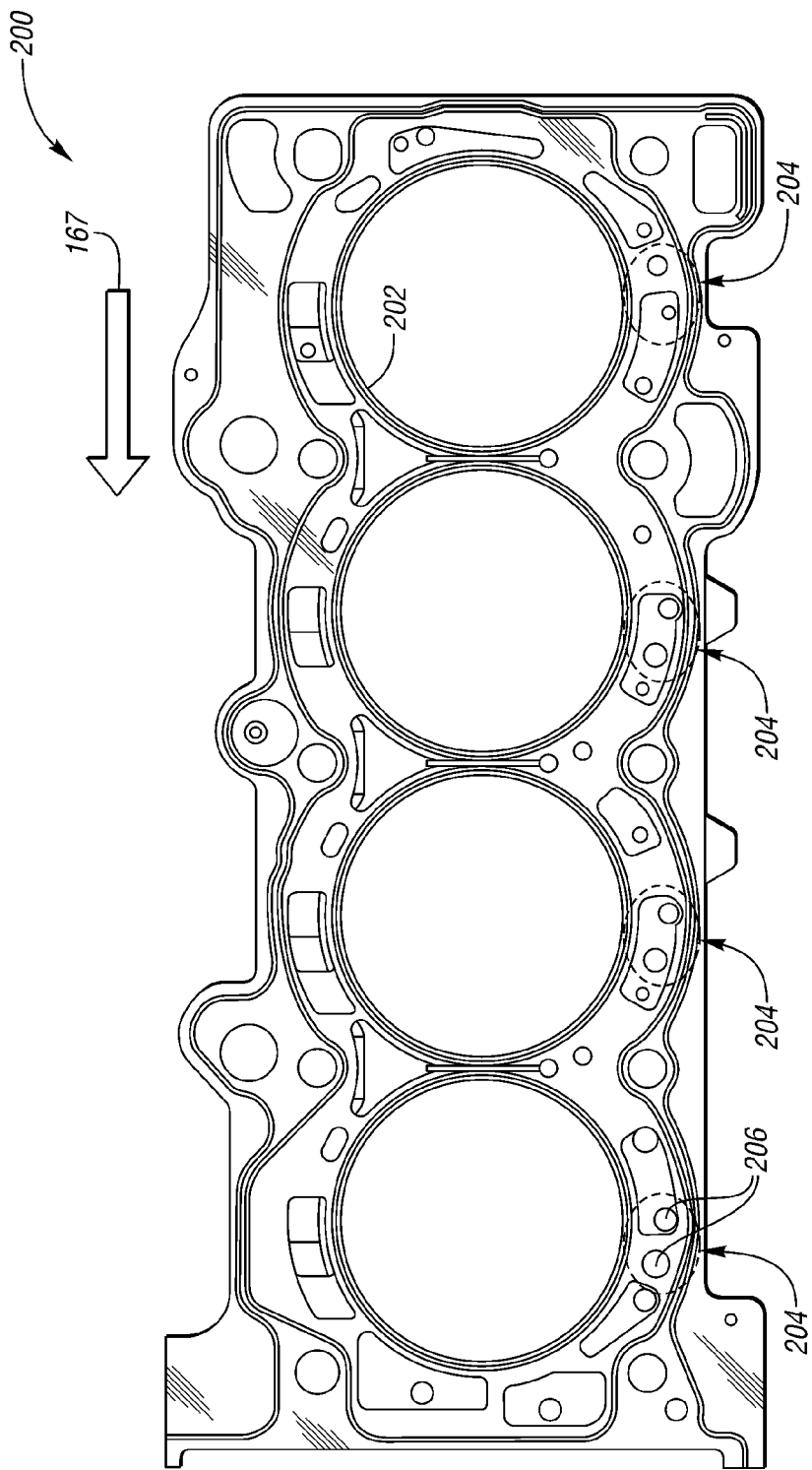
FIG. 5 illustrates a perspective view of a head gasket for use with the cylinder head of FIG. 4 according to an embodiment.

FIG. 5 illustrates a head gasket 200 that cooperates with the cylinder head 150 of FIG. 4 and a corresponding cylinder block to form the cylinders of the engine via apertures 202. Coolant in the cooling system may flow from passages in the cylinder block cooling jacket through various apertures in the gasket 200 to cooling passages in the cylinder head 150 cooling jacket. Some of the coolant from the cylinder block cooling jacket is directed to the exhaust bridge cooling passages. The gasket also defines various apertures corresponding to bolt holes or other components of the engine. In one example, the gasket 200 is constructed from multiple layers, and each layer may be made from steel or another suitable material. A center layer may be used as a spacer, and it may assist in determining the gasket thickness as well as provide a medium to form the apertures for the exhaust bridge cooling passage. The apertures may be formed by stamping the center layer of the gasket.

Each exhaust bridge cooling passage 166 receives coolant from the cylinder block through an associated pair of apertures 204. Each aperture 206 in the pair of apertures 204 directs fluid into an opposed end region of the inlet channel 170 of the exhaust bridge passage 166. The apertures 206 may be circular to aid in manufacturability. In other examples, the pair of apertures 204 may include additional apertures feeding coolant to a single passage. In further examples, one or all of the apertures 206 associated with a passage 166 may be a single larger aperture, and/or may be various shapes including complex geometric or curved shapes. The relative sizes of the apertures 206 in the gasket providing coolant to each exhaust bridge passage 166 may vary based on the desired coolant streamlines and volumetric flow rate. The relative sizes of the apertures 206 in the gasket 200 for different exhaust bridge passages 166 may also vary based on the desired coolant streamlines and volumetric flow rates of coolant between various passages. In other embodiments, the head gasket 200 may have only one aperture 206 providing coolant to each exhaust bridge passage 166, and the apertures 206 may be the equivalent diameter or different diameters. The gasket 200 may have different configurations for different engines.

Four pair of apertures 204 and associated exhaust bridge passages 166 are illustrated in FIGS. 4-5. The relative diameters of each aperture 206 in a pair of apertures 204 vary from one another. Additionally, the total area of the pairs of apertures 204 increases along the axis 167 to control the flow into the respective passages 166. The sizes of the apertures 206 are selected to control flow to the passages 166 and may make the coolant flow rate to the passages 166 generally uniform between the passages 166, as the pressure and velocity of the coolant varies along the cylinder block passage providing coolant.

The increased area of the inlet channel 170 in the plane of the deck face 152 allows for the variability in aperture 206 size and shape. Additionally, functional apertures 206 may be provided that are larger than the diameter of the conduit 172.

Figure 6:
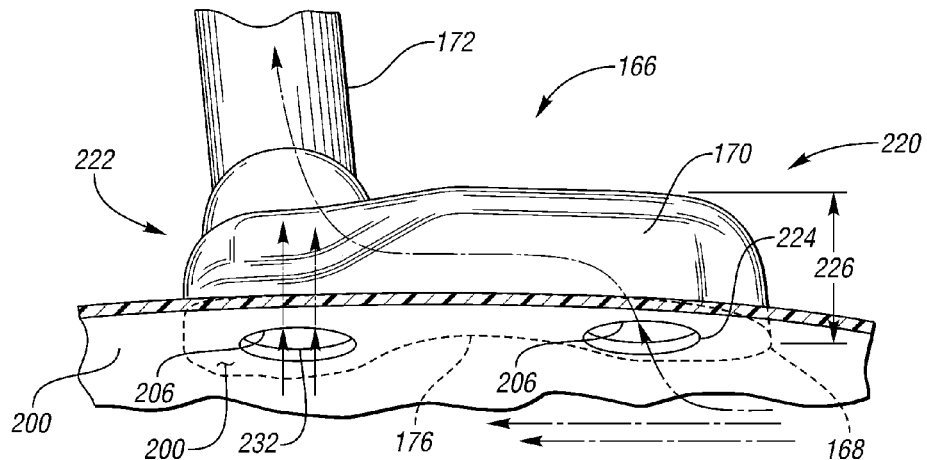
FIG. 6 illustrates a partial perspective view of an exhaust bridge coolant passage in a cylinder head according to an embodiment.
Figure 7:
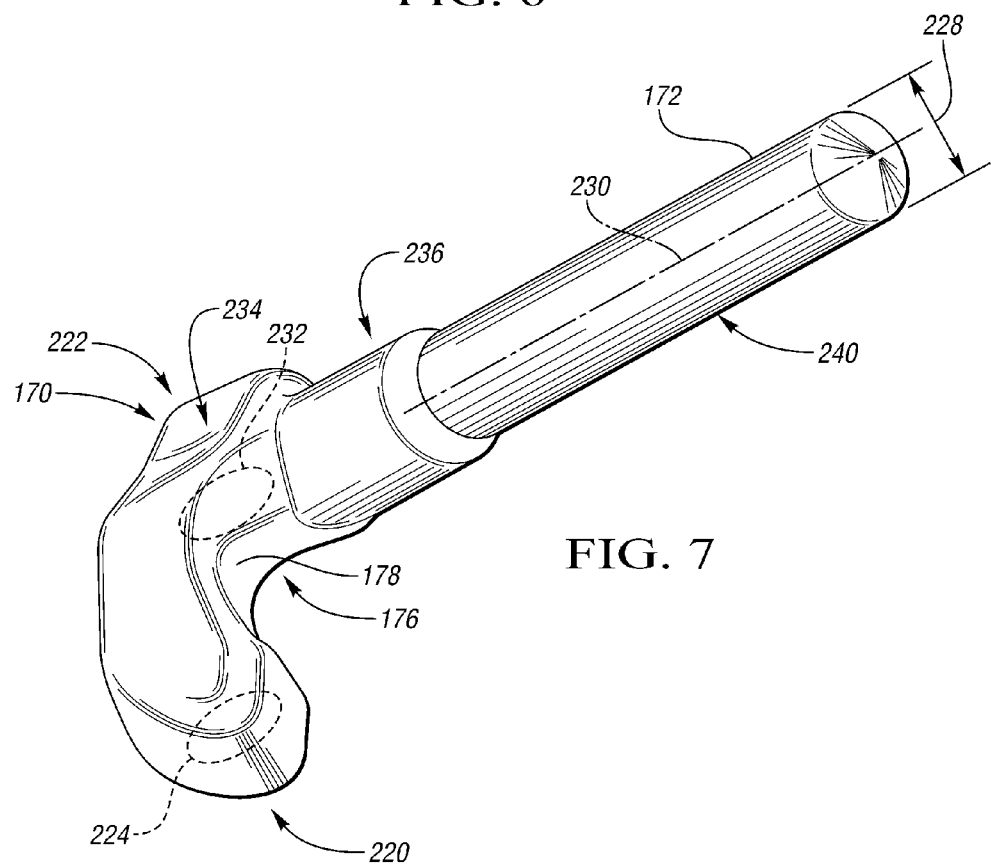
FIG. 7 illustrates another partial perspective view of the passage of FIG. 7.
Figure 8:
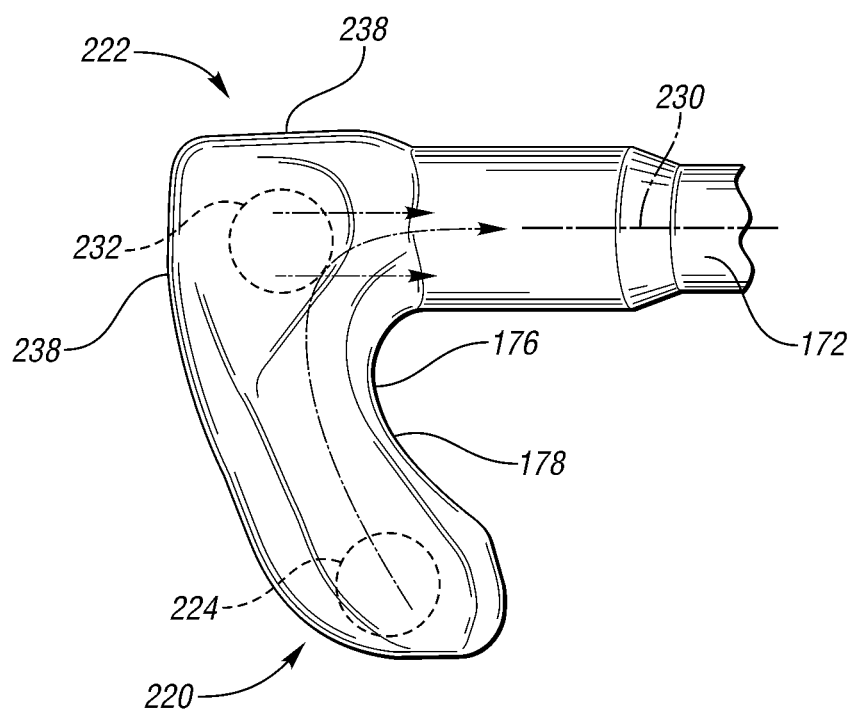
FIG. 8 illustrates yet another partial perspective view of the passage of FIG. 7.

FIGS. 6-8 illustrate the inner surface of the exhaust bridge cooling passage 166 and a section of the gasket 200 in various perspective views. Coolant flow streamlines through the cylinder block passage, gasket apertures 206 and passage 166 are shown by arrows. The conduit 172 extends between exhaust valve seats in an exhaust bridge 164 and then exits to another section of the cylinder head cooling jacket or the cooling system.

FIGS. 6-8 shows the use of water or coolant fluid momentum to drive flow into the conduit 172. Coolant is generally moving toward rear of engine, or to the left in FIG. 6. FIG. 8 illustrates the passage with respect to a cylinder, exhaust valve ports 158, and exhaust bridge 164. The inlet channel 170 or pocket provides a smoother transition to the conduit 172 or drill passage that lowers flow restriction in the conduit 172 and results in improved flow characteristics through the conduit 172 and a higher system flow. The advantage of a higher system flow is better control over coolant temperatures and in turn, engine temperatures. The boot shape of the inlet channel 170 provides for multiple feeds of coolant into the passage 166 through the gasket 200 and control of fluid streamlines into the conduit 172.

The channel 170 has an upstream end region 220 and a downstream end region 222. A first aperture 224 in the gasket 200 is adjacent to and provides flow to the upstream end region 220. Coolant flow through the first aperture 224 and along the length of the channel 170 may be considered the primary flow into the passage. In some examples, the depth 226 of the channel 170 may be approximately the same dimension as the diameter 228 of the conduit 172. The coolant streamline makes approximately a ninety degree turn after entering the channel 170 to flow along the channel. The coolant is directed by the convex surface 178 in the channel 170 that forms a fillet radius that begins to turn the coolant streamline towards the longitudinal axis 230 of the conduit 172.

A second aperture 232 in the gasket 200 is adjacent to and provides flow to the downstream end region 222. Coolant flow through the second aperture 232 may be considered the secondary flow into the passage. The coolant streamlines makes approximately a ninety degree turn after entering the channel 170 through aperture 232 to flow into the conduit 172. The coolant from the second aperture 232 combines with the coolant from the first aperture 224 in the downstream end region 222 of the channel 170. The two coolant flows mix to create a more uniform coolant stream that enters the conduit 172. The apertures 224, 232 may be sized such that coolant flow from one aperture complements the other to provide a uniform mixed flow into the conduit 172. The coolant may be directed by another convex surface 234 that is interposed between the entrance 168 region of the downstream end 222 of the channel 170 and the conduit 172. An intermediate conduit 236 may connect the channel 170 and the conduit 172 to further direct and funnel the coolant into the conduit 172.

In some examples, the channel 170 has surfaces 238 on the downstream end 222 of the channel 170 may be near-flush to conduit 172 or intermediate conduit 236 surface. Some amount of clearance may be needed for high-volume production manufacturing. By reducing the amount of volume in the channel 170 in the regions where surfaces 238 are present, swirling flow at the entrance to the conduit 172 may be reduced, thereby also reducing any flow restrictions.

The two apertures in the gasket 200 and the elongated channel 170 (with contoured features to direct the coolant stream to the conduit 172) provide for an increased velocity in the conduit 172 in a section 240 of the conduit adjacent to the valve seat and generally uniform flow across and through the conduit 172. Conventional or prior art exhaust valve bridge passages may have reduced velocities in this region, and may also include recirculation zones.

Figure 9:
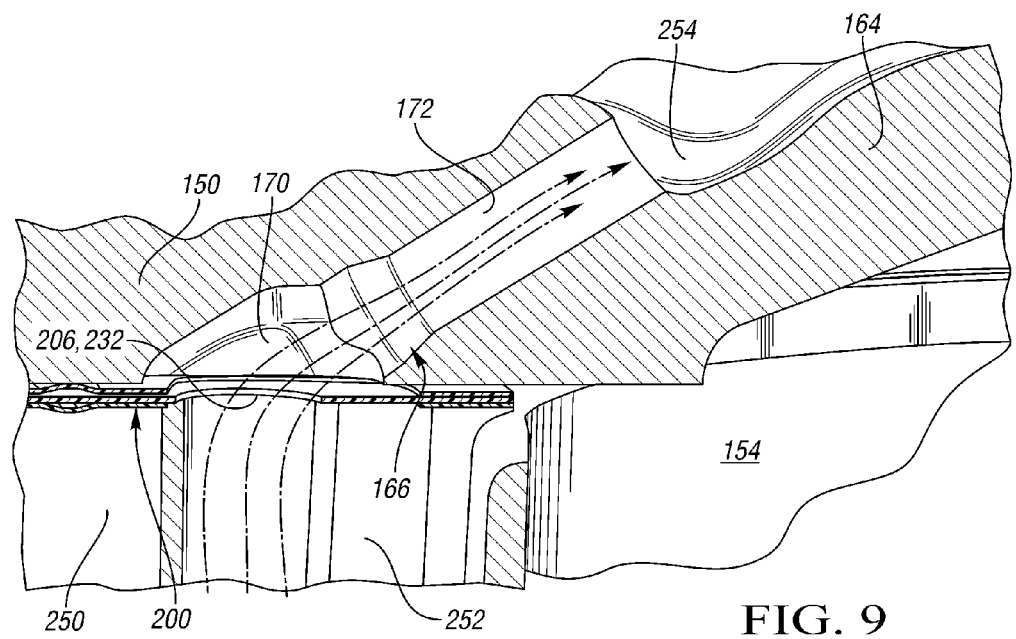
FIG. 9 illustrates a partial perspective sectional view of an engine according to an embodiment.
Figure 10:
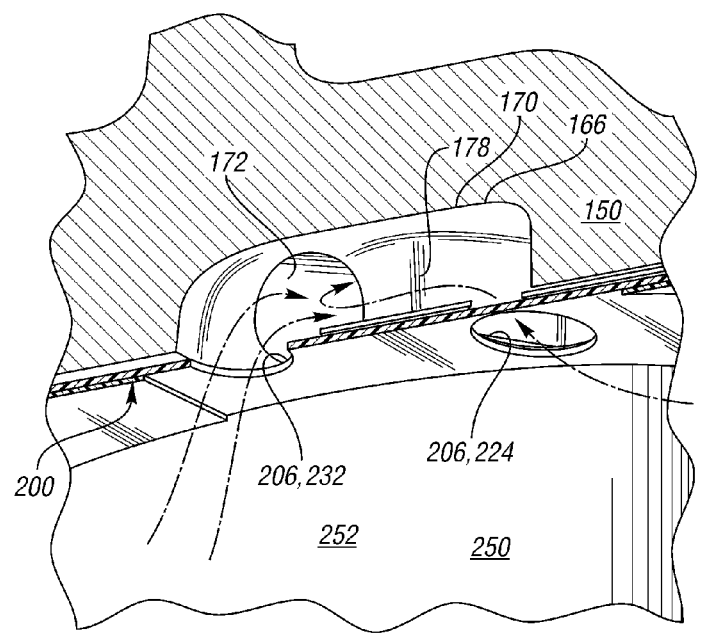
FIG. 10 illustrates another partial perspective sectional view of the engine of FIG. 9.

FIGS. 9-10 illustrate coolant flow from the cylinder block, across the gasket, and into the exhaust bridge cooling passage of the cylinder head according to an embodiment of the present disclosure. FIG. 9 illustrates a perspective cross sectional view taken generally laterally across a portion of the engine. FIG. 10 illustrates a perspective cross sectional view taken generally longitudinally across a portion of the engine.

The cylinder head 150 is connected to the cylinder block 250 with a gasket 200 positioned between. The cylinder block 250 forms a cooling jacket having passages 252 formed therein to direct coolant. The gasket 200 has apertures 206 formed therein to direct coolant from the cylinder block passage 252 to the exhaust bridge passage 166 that formed within an exhaust bridge 164 of the cylinder head 150. The apertures 206 illustrated corresponds to aperture 232, which is adjacent to the conduit 172. Coolant flow through the aperture 232 merges in the inlet channel 170 with coolant flow from the other aperture 224. The coolant mixes and flows through the conduit 172 in the exhaust bridge 164 and into a passage 254 of a cooling jacket formed by the cylinder head 150.

Various embodiments of the present disclosure have associated, non-limiting advantages. For example, for a given drill diameter, the coolant flow through the exhaust bridge drill or cooling passage can be increased significantly by improving the geometry at the entrance to the drilling to reduce losses at the entrance of the drill. An inlet channel to the exhaust bridge coolant passage may be provided and be extended along an upstream direction of coolant flow in the cylinder block to allow for a greater area and volume to prepare the flow that is transferred from the cylinder block to the exhaust bridge coolant passage. The inlet channel may include a convex surface that provides a large fillet radius before the entrance to the conduit of the exhaust bridge cooling passage to better direct the flow to reduce losses. Additionally, a head gasket may be used that provides two apertures, or apertures in other configurations, in fluid communication with the exhaust bridge coolant passage to provide for improved flow control, including velocity and streamline, within the exhaust bridge cooling passage and conduit.

While exemplary embodiments are described above, it is not intended that these embodiments describe all possible forms of the present disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An internal combustion engine comprising:
   a cylinder block defining first and second cylinders and a block cooling jacket having an open passage along a block deck face;
   a cylinder head having a deck face defining a first chamber with a first pair of exhaust ports spaced apart by a first exhaust bridge, and a second chamber with a second pair of exhaust ports spaced apart by a second exhaust bridge, the cylinder head having a head cooling jacket with a first passage adapted to cool the first exhaust bridge and a second passage adapted to cool the second exhaust bridge, each passage formed by an inlet channel and a conduit adjacent to the associated exhaust bridge, each inlet channel intersecting the deck face and elongated along a longitudinal axis of the cylinder head to be offset from the associated conduit; and
   a head gasket interposed between the cylinder block and the cylinder head, the head gasket defining a first aperture interposed between the open passage of the block cooling jacket and the inlet channel of the first passage, and a second aperture interposed between the open passage of the block cooling jacket and the inlet channel of the second passage.

2. The internal combustion engine of claim 1 wherein a diameter of the first aperture is different than a diameter of the second aperture.

3. The internal combustion engine of claim 1 wherein the head gasket defines a third aperture interposed between the open passage of the block cooling jacket and the inlet channel of the first passage, and a fourth aperture interposed between the open passage of the block cooling jacket and the inlet channel of the second passage.

4. The internal combustion engine of claim 3 wherein the first and third apertures have a first cross sectional area, and the second and fourth apertures have a second cross sectional area larger than the first cross sectional area.

5. A cylinder head comprising:
   a deck face; and
   a cooling jacket having a passage formed by an inlet channel with a conduit at one end and extending into an exhaust bridge between adjacent exhaust ports, the inlet channel intersecting the deck face and elongated along a longitudinal axis of the cylinder head, the inlet channel having a convex surface positioned between opposed ends of the channel and extending away from the deck face.

6. The cylinder head of claim 5 wherein the deck face defines an entrance to the inlet channel having a concave profile and a convex profile in a plane of the deck face.

7. The cylinder head of claim 5 wherein the inlet channel is generally perpendicular to the longitudinal axis of the conduit.

8. The cylinder head of claim 5 wherein the passage forms a converging section interposed between the inlet channel and the conduit.

9. The cylinder head of claim 5 wherein the inlet channel has an upstream end region and a downstream end region, the downstream end region adjacent to the conduit, the upstream end region spaced apart from the conduit.

10. The cylinder head of claim 9 wherein the downstream end region defines a second convex surface interposed between the deck face and the conduit.

11. The cylinder head of claim 9 wherein a depth of the upstream end region is at least a diameter of the conduit.

12. The cylinder head of claim 9 wherein a first surface of the downstream end region and a second surface of the downstream end region are near-flush with the surface of the conduit.

13. An engine comprising:
    a cylinder block defining a cylinder and a block cooling jacket having an open passage along a block deck face;
    a cylinder head having an exhaust bridge conduit; and
    a head gasket placed between the block and the head, the head gasket defining first and second apertures connecting the open passage of the block cooling jacket to the exhaust bridge conduit.

14. The engine of claim 13 wherein the exhaust bridge conduit has an elongated inlet channel having upstream and downstream end regions; and
    wherein the head gasket defines a second aperture connecting the open passage to the exhaust bridge conduit, the second aperture spaced apart from the first aperture and adjacent to the downstream end region of the inlet channel.

15. The engine of claim 13 wherein a diameter of the first aperture is greater than a diameter of the second aperture.

16. The engine of claim 13 wherein the first aperture is adjacent to the upstream end region of the inlet channel.

17. The engine of claim 13 wherein the first aperture has a smaller cross-sectional area than a cross-sectional area of an entrance to the inlet channel at a deck face of the cylinder head.

18. A head gasket for an engine having a cooling jacket comprising:
    a generally planar gasket body having an upper surface for cooperation with a cylinder head deck face and a lower surface for cooperation with a cylinder block deck face, the gasket having formed therein:
    a first pair of apertures extending between the upper and lower surfaces of the gasket body and adjacent to a cylinder block cooling passage, one of the first pair of apertures adjacent to an upstream end of an elongated entrance region to a first exhaust bridge cooling passage associated with a first cylinder, the other of the first pair of apertures adjacent to a downstream end of the elongated entrance region to the first exhaust bridge cooling passage; and
    a second pair of apertures extending between the upper and lower surfaces of the gasket body and adjacent to the cylinder block cooling passage, one of the second pair of apertures adjacent to an upstream end of an elongated entrance region to a second exhaust bridge cooling passage associated with a second cylinder, the other of the second pair of apertures adjacent to a downstream end of the elongated entrance region to the second exhaust bridge cooling passage;

wherein a summed cross sectional area of each pair of apertures increases for each cylinder along a direction of coolant flow in the cylinder block cooling passage.

19. The head gasket of claim 18 wherein the other of the first pair of apertures has a smaller diameter than the one of the first pair of apertures; and wherein the other of the second pair of apertures having a smaller diameter than the one of the second pair of apertures.

20. The head gasket of claim 19 wherein the one of the first pair of apertures has a smaller diameter than the one of the second pair of apertures.

* * * * *